US012768977B1

(12) United States Patent
Johnston et al.

(10) Patent No.: US 12,768,977 B1
(45) Date of Patent: Oct. 20, 2026

(54) SYSTEM FOR DESIGN OF A RADAR WARNING RECEIVER

(71) Applicant: BAE SYSTEMS Information and Electronic Systems Integration Inc., Nashua, NH (US)

(72) Inventors: Aaron Johnston, Bedford, NH (US); Thomas C. Anderson, Westford, MA (US); Cameron M. Johns, Nashua, NH (US); Josiah T. Perrin, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 236 days.

(21) Appl. No.: 18/531,330

(22) Filed: Dec. 6, 2023

(51) Int. Cl.
*G01S 13/50* (2006.01)

(52) U.S. Cl.
CPC .................................... *G01S 13/50* (2013.01)

(58) Field of Classification Search
None
See application file for complete search history.

(56) References Cited

U.S. PATENT DOCUMENTS

2009/0322584 A1* 12/2009 Herman ................ G01S 13/726 342/13
2017/0031002 A1* 2/2017 Newton .................. G01S 7/021

OTHER PUBLICATIONS

Self, A.G., and B.G. Smith. "Intercept Time and its Prediction." Journal of Electronic Defense, vol. 132, No. 4, Jul. 1985, pp. 215-222.
Sharpe, W.F. (1964), Capital Asset Prices: a Theory of Market Equilibrium Under Conditions of Risk*. The Journal of Finance, 19: 425-442. https://doi.org/10.1111/j.1540-6261.1964.tb02865.x.
Will Kenton "Capital Asset Pricing Model (CAPM) and Assumptions Explained" https://www.investopedia.com/articles/06/capm.asp; Updated May 24, 2023 (6 pages).
B.R. Hatcher "EW Acquisition Systems, Probability of Intercept and Intercept Time" Watkins-Johnson Company Tech-notes; vol. 3, No. 3, May/Jun. 1976: 1-11.

* cited by examiner

*Primary Examiner* — Ladimir Magloire
(74) *Attorney, Agent, or Firm* — Gary McFaline

(57) ABSTRACT

Techniques are provided for radar warning receiver (RWR) threat analysis. A methodology implementing the techniques according to an embodiment includes calculating a cumulative probability of intercept (POI) of a threat signal based on overlaps of dwell durations of an RWR scan schedule with durations of a threat illumination and calculating a mean time between the overlaps. The method also includes adjusting a dwell revisit time of the RWR based on utilization of the RWR and on a comparison of the cumulative POI to a required POI. The method further includes adjusting the RWR scan schedule to enable sharing of dwells by a plurality of threats based on pulse repetition intervals of the threats and on the durations of the threat illuminations. The method further includes adjusting the mean time between the overlaps to provide a predicted time to confirmed track that achieves a required time to confirmed track.

20 Claims, 14 Drawing Sheets

FIG. 1
Threat Data
100
Configuration
Parameters
110
Radar Warning Receiver
Design Tool
120
Performance
Prediction
Report
130

Efficient Frontier Plot
1200

SYSTEM FOR DESIGN OF A RADAR WARNING RECEIVER

STATEMENT OF GOVERNMENT INTEREST

This invention was made with United States Government assistance under Contract No. 1333000. The United States Government has certain rights in this invention.

FIELD OF DISCLOSURE

The present disclosure relates to radar warning receivers, and more particularly to threat analysis for the design of radar warning receivers.

BACKGROUND

Radar warning receivers (RWRs) are employed to scan a radio frequency (RF) spectrum, detect illuminations from threats within that spectrum, and provide a warning of those threats, for example to a pilot of an aircraft. RWRs generally do not have the capability to simultaneously scan for all threats over the entire bandwidth of the RF spectrum in which the threats operate, and so they typically search on a scan schedule in which the resources of the RWR are allocated to address a subset of the threats. The design of the operating parameters of the RWR, including the scan schedule, is a complex and time consuming task, which may therefore be performed infrequently. Typically, the RWR operates with a set of static parameters and scan schedule that may be suboptimal in dynamic threat environments.

Figure 1:
FIG. 1 illustrates a top level implementation of a radar warning receiver (RWR) design tool, in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

Techniques are provided herein for the design of RWRs based on probabilistic threat modelling, which enables threat environments to be assessed more efficiently. As noted above, RWRs resources are limited and so it is generally not possible or practical to simultaneously scan for all threats over the entire bandwidth of the RF spectrum in which threats operate. As such, the RWR may operate on a scan schedule in which the resources of the RWR are allocated. The design of an RWR (including the operating parameters of the RWR and the scan schedule) to address the most important threats in an efficient manner, is a complex and time consuming task, which may therefore be performed infrequently.

To this end, and in accordance with an embodiment of the present disclosure, a system for the design of an RWR is disclosed which is configured to construct a scan schedule (and other RWR operating parameters) that utilizes the time and resources of the RWR dynamically, and to greatest efficiency, to maximize threat coverage. The system uses probabilistic threat modelling and risk assessment to reduce reliance on the large number of threat parameters that are typically included in threat data intelligence sources (which can number in the hundreds or thousands of parameters) and instead focus on a smaller subset of higher level threat parameters.

In accordance with an embodiment, a methodology for RWR design includes calculating a cumulative probability of intercept (POI) of a threat signal based on overlaps of dwell durations of an RWR scan schedule with durations of a threat illumination, and calculating a mean time between the overlaps. The method also includes adjusting a dwell revisit time of the RWR based on utilization of the RWR and based on a comparison of the cumulative POI to a required POI. The utilization is a ratio of the dwell duration of the RWR to the dwell revisit time of the RWR. The method further includes adjusting a scan schedule of the RWR, the scan schedule comprising the dwell durations and the dwell revisit times of the RWR. The adjustment enables sharing of dwells by a plurality of threats based on pulse repetition intervals (PRIs) of the threats and based on the durations of the threat illuminations. The method further includes adjusting the mean time between the overlaps to provide a predicted time to confirmed track that achieves a required time to confirmed track, wherein the predicted time to confirmed track is proportional to the adjusted mean time between the overlaps.

It will be appreciated that the techniques described herein may provide an improved process for RWR design compared to methods that employ labor intensive threat modelling using large numbers of threat parameters. Numerous embodiments and applications will be apparent in light of this disclosure.

System Architecture

FIG. 1 illustrates a top level implementation of a radar warning receiver (RWR) design tool 120, in accordance with certain embodiments of the present disclosure. The RWR design tool 120 is shown to accept threat data 100 and RWR configuration parameters 110 as input, and to generate a performance prediction report 130 as output, using techniques described in greater detail below.

In some embodiments, the threat data 100 may include parameters that describe threat waveforms such as frequency, pulsewidth (PW), and PRI. In some embodiments, the RWR configuration parameters 110 may include the time between scan schedules (TBSS), the required efficiency, the required POI, the required utilization, and the required time to confirmed track. In some embodiments, the performance prediction report 130 may include achieved utilization, predicted cumulative POI, predicted time to confirmed track, an efficiency score, and an efficient frontier plot, as will be described below.

Figure 2:
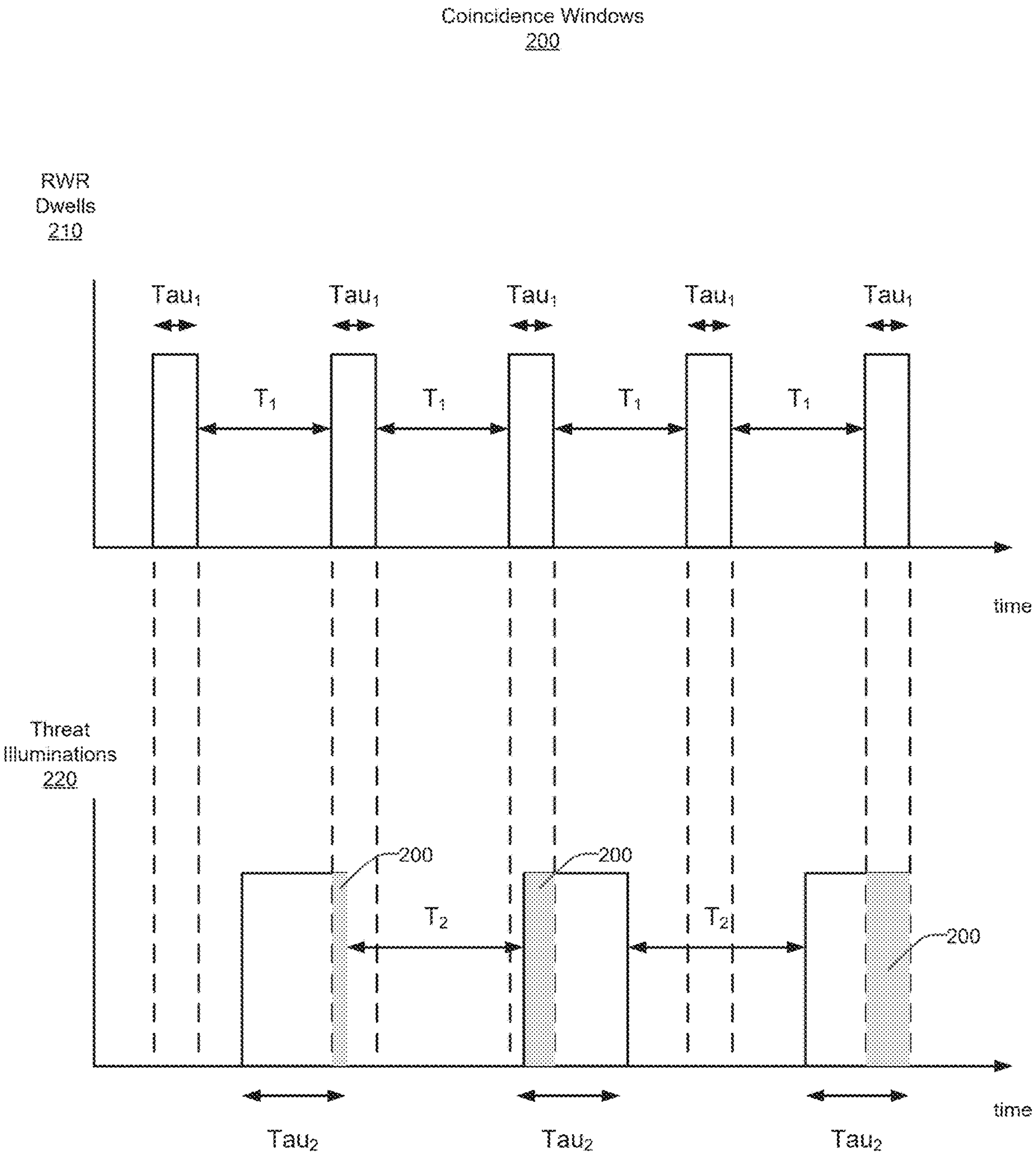
FIG. 2 illustrates dwell coincidence windows in a scan schedule, in accordance with certain embodiments of the present disclosure.

Before describing the components of the RWR design tool 120 in detail, it is useful to describe dwells and coincidence windows within a scan schedule. FIG. 2 illustrates coincidence windows 200 between dwells and threat illuminations, in accordance with certain embodiments of the present disclosure. RWR dwells 210 are shown to repeat at intervals of $T_1$ seconds, where $T_1$ is the dwell revisit time. Each RWR dwell lasts for a dwell duration of $\tau_1$ seconds. The RWR parameters $T_1$ and $\tau_1$ are set in accordance with a scan schedule. Threat illuminations 220 are shown to repeat at intervals of $T_2$ seconds, where $T_2$ is the threat revisit time. Each threat illumination lasts for a duration of $\tau_2$ seconds. The threat illumination parameters $T_2$ and $\tau_2$ are controlled by the threat. Coincidence windows 200 represent overlap between the RWR dwells 210 and the threat illuminations 220. A POI is the probability of an RWR dwell coinciding with a threat illumination under a given scan schedule. After all the dwells in the scan schedule have been used, the scan schedule repeats. The period of the scan schedule is the TBSS. An RWR design goal is to maximize the number of threats that can be handled in a TBSS to achieve improved performance while reducing risk.

Figure 3:
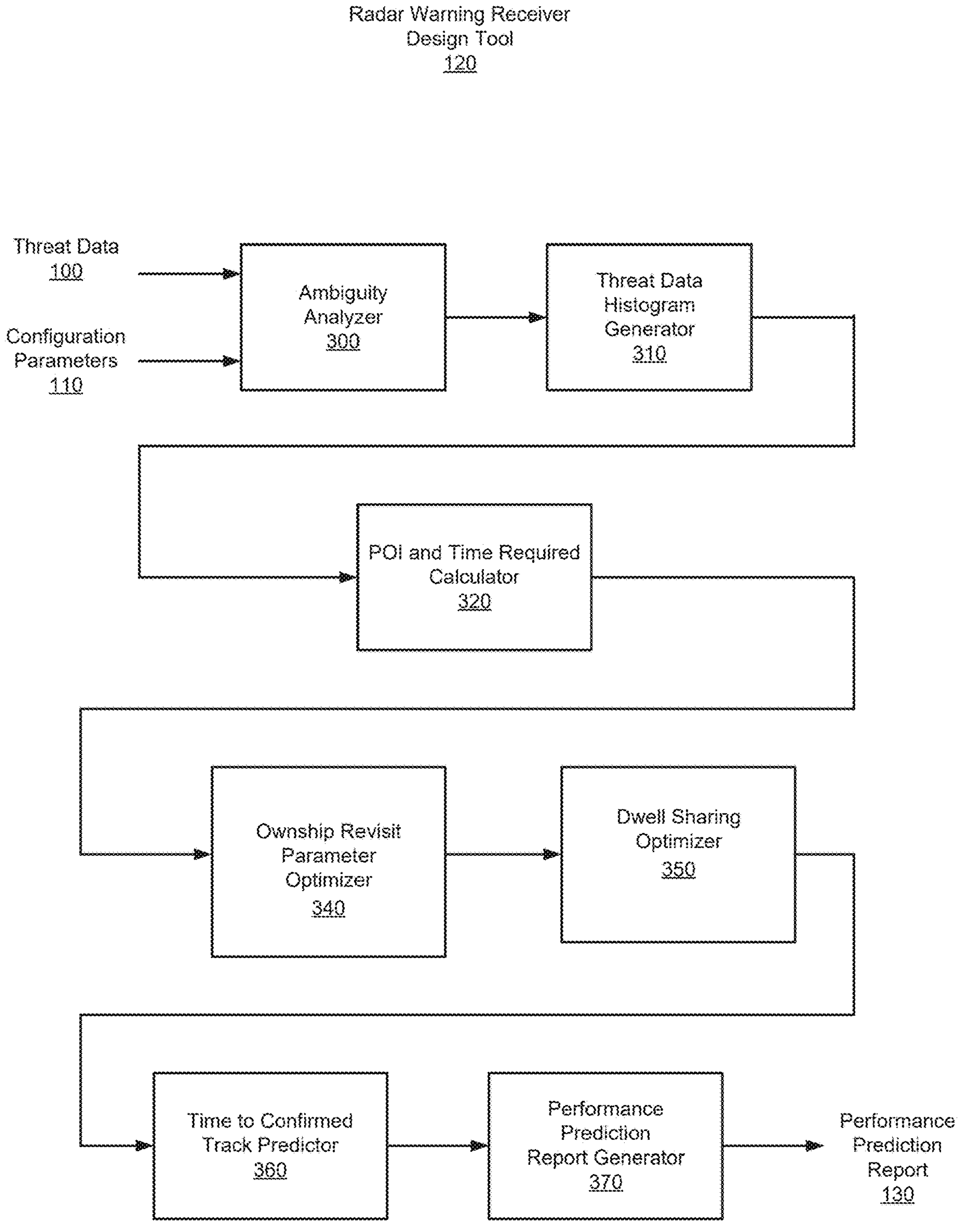
FIG. 3 is a block diagram of the RWR design tool of FIG. 1, configured in accordance with certain embodiments of the present disclosure.

FIG. 3 is a block diagram of the RWR design tool 120 of FIG. 1, configured in accordance with certain embodiments of the present disclosure. The RWR design tool 120 is shown to include an ambiguity analyzer 300, a threat data histogram generator 310, a POI and time required calculator 320, an ownship revisit parameter optimizer 340, a dwell sharing optimizer 350, a time to confirmed track predictor 360, and a performance prediction report generator 370. The operation of these components will be described in greater detail below, but at a high level, the RWR design tool is configured to allocate resources (e.g., the number of dwells or time spent in a scan schedule) based on an evaluation of the ambiguity of the threat (e.g., the ability to distinguish it from other threats) and an evaluation of the impact of including the threat in the scan schedule. Additionally, the RWR design tool is configured to calculate POIs, cumulative POIs, and times required to achieve desired cumulative POIs for the threats, and then adjust threat revisit rates in the scan schedule to meet a required POI. The RWR design tool is further configured to improve the scan schedule by attempting to find dwells that can be shared by two or more threats and to adjust the mean time between overlaps of dwells with threat illuminations to provide a predicted time to confirmed track that meets requirements, as will be explained below.

Figure 4:
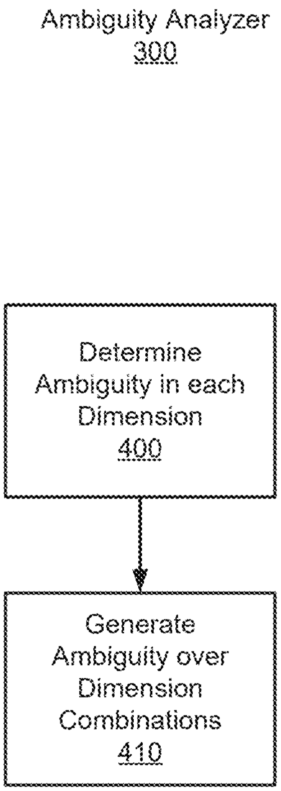
FIG. 4 is a block diagram of the ambiguity analyzer of FIG. 3, configured in accordance with certain embodiments of the present disclosure.

FIG. 4 is a block diagram of the ambiguity analyzer 300 of FIG. 3, configured in accordance with certain embodiments of the present disclosure. An RWR system is configured to identify the threats in the environment. This may be accomplished, at least in part, by matching identified characteristics of the received threat signal to a data base of threat characteristics. The parameters may include, for example, frequency, pulsewidth (PW) and PRI. Even though the RWR scan schedule hops around in frequency, the measurement of threat frequencies is relatively reliable. However, in order to determine PW, the scan schedule needs to capture the rising and falling edge of a pulse, and in order to determine PRI the scan schedule needs to observe some number of pulses (typically three or more). For this reason, frequency is employed as a primary measure to disambiguate threats. If threat emitter A transmits at 3.3 GHZ and threat emitter B transmits at 3.9 GHZ, then the two emitters can be resolved in frequency. As the number of threats grow (e.g., into the hundreds or more) the frequency space becomes crowded and additional dimensions such as PW and PRI (or other suitable characteristics) are needed to resolve ambiguity.

At operation 400, the ambiguity analyzer 300 determines ambiguity in each dimension (e.g., frequency, PW, and PRI). For example, emitter A frequency is measured at 3.3 GHZ, but it is known to operate between 3.0 and 3.5 GHz. Emitter A is tested against all other threats, and it is noted that emitter B operates between 3.4 GHz and 3.6 GHz. Emitter A has a 20% overlap with emitter B resulting in a 20% ambiguity in the frequency dimension.

At operation 410, ambiguity analyzer 300 generates ambiguity over dimension combinations. The threat currently under consideration is compared against other threats in the threat list to determine the percentage of a dimension where overlap occurs between the two threats to determine combined ambiguity probabilities. For example, if emitter A has a 20% overlap with emitter B in frequency, a 10% overlap in PW, and a 30% overlap in PRI, then the combined ambiguity is 0.2*0.1*0.3 which is a 0.6% three dimensional overlap.

The combined ambiguity is useful because, for example, if emitter A and emitter B overlap 100% in RF and PW dimensions but have 0% overlap in the PRI dimension, then the scan schedule needs to ensure that a sufficient number of pulses are intercepted such that PRI can be determined in order to meet identification performance requirements.

The ambiguity analysis is performed before the POI analysis because a threat that has high ambiguity with other threats may require that the dwell be extended to collect enough pulses to capture PRI and resolve ambiguity. The RWR system is then consuming more utilization than is required for this threat, but the additional utilization has a return on investment in the form of improved identification performance.

Figure 5:
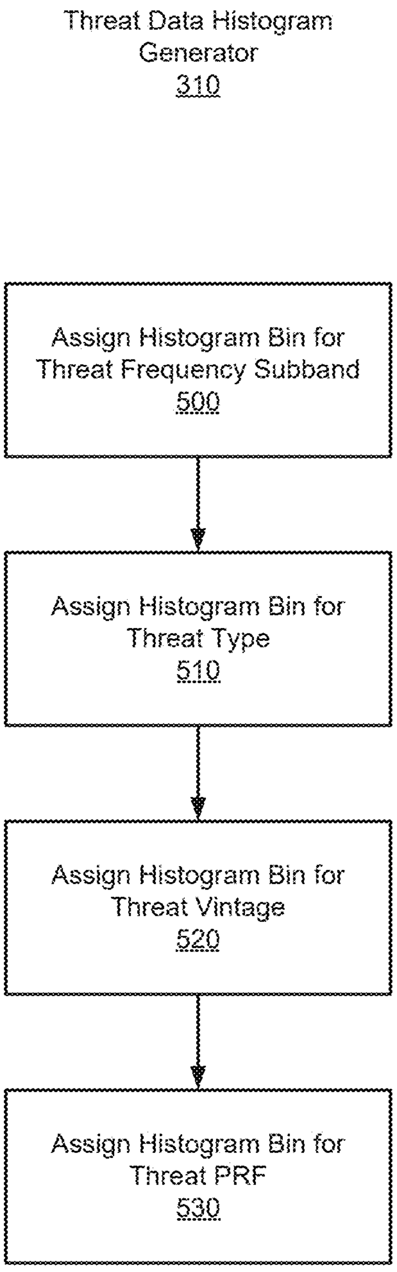
FIG. 5 is a block diagram of the threat data histogram generator of FIG. 3, configured in accordance with certain embodiments of the present disclosure.

FIG. 5 is a block diagram of the threat data histogram generator 310 of FIG. 3, configured in accordance with certain embodiments of the present disclosure. For each threat waveform, measured characteristics are used to categorize the threat type using histogram bins.

At operation 500, histogram bins are assigned for user-defined threat frequency subbands. At operation 510, histogram bins are assigned for threat type. In some embodiments, threat types include airborne threats, ground based threats, and naval threats. These threat type characteristics may be determined based on intelligence data or other suitable sources.

At operation 520, histogram bins are assigned for threat vintage. In some embodiments, threat vintages include legacy threats and advanced threats. A legacy threat is generally considered to be pre-1980 vintage and is characterized by a regular or consistent timing in the appearance of the threat waveform that is predictable. In contrast an advanced threat is of later vintage and generally uses a phased array antenna with more complex waveforms, including low probability of intercept waveforms. These threat vintage characteristics may be determined based on intelligence data or other suitable sources.

At operation 530, histogram bins are assigned for threat pulse repetition frequency (PRF) (e.g., the inverse of PRI). In some embodiments, threat PRFs may be binned into three categories: low (e.g., below 5 KHz), medium (e.g., 5-30 KHz), or high (e.g., greater than 30 KHz). The division of these categories may be selected based on intelligence data or other suitable sources. The results of the histograms may be plotted as shown in FIG. 6.

Figure 6:
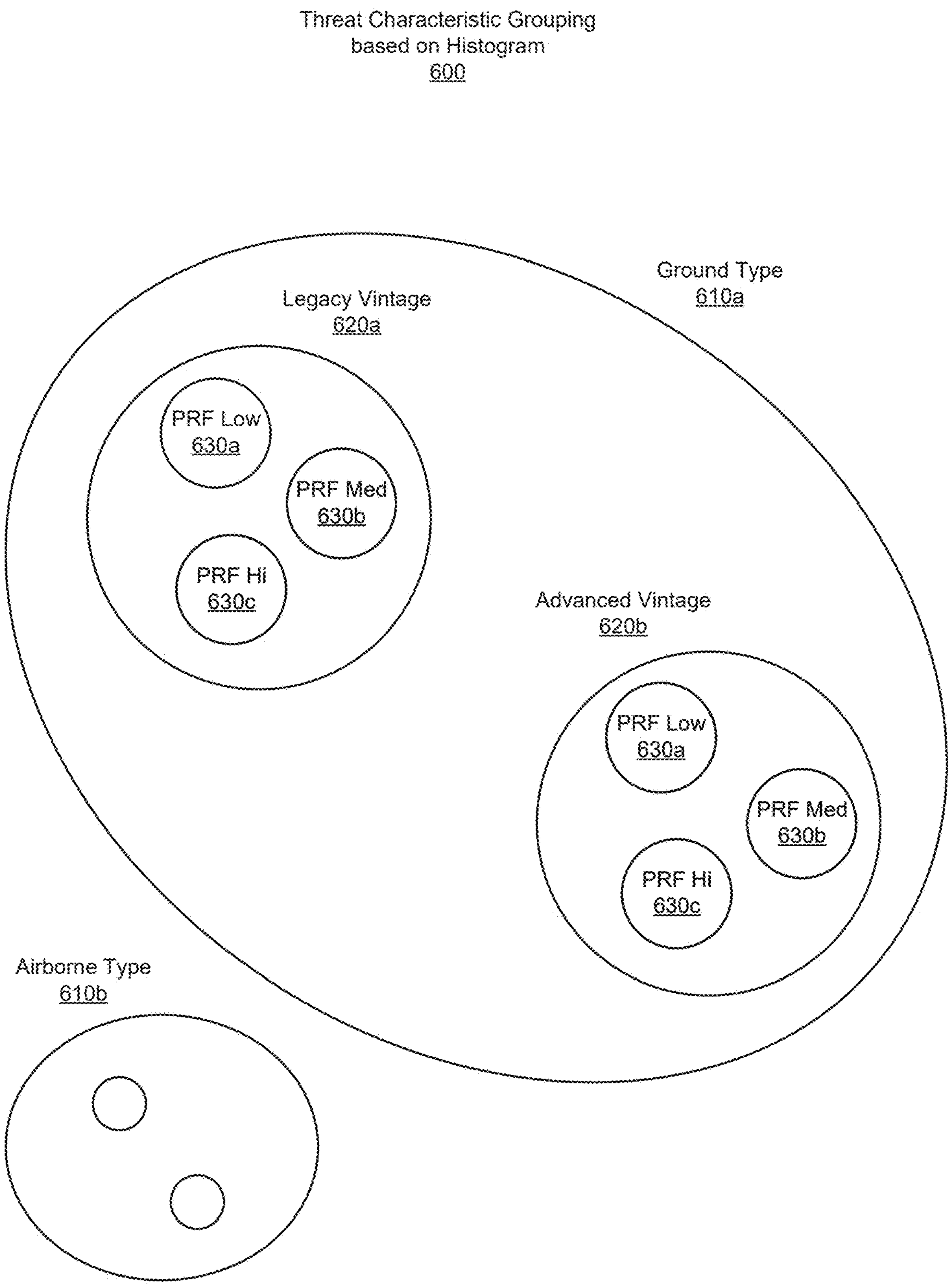
FIG. 6 illustrates threat characteristic grouping, in accordance with certain embodiments of the present disclosure.

FIG. 6 illustrates threat characteristic grouping 600, in accordance with certain embodiments of the present disclosure. As shown in this example, the threat waveform may be classified as ground type 610*a* or airborne type 610*b*. Within the ground type category, further division may result in legacy vintage 620*a* and advanced vintage 620*b*. Each of those categories may be further divided into low PRF 630*a*, medium PRF 630*b*, and high PRF 630*c*. The purpose of histogramming and characterization grouping is to form families of threat waveforms with common characteristics that can be employed in prediction modelling using relatively high level threat definitions.

Figure 7:
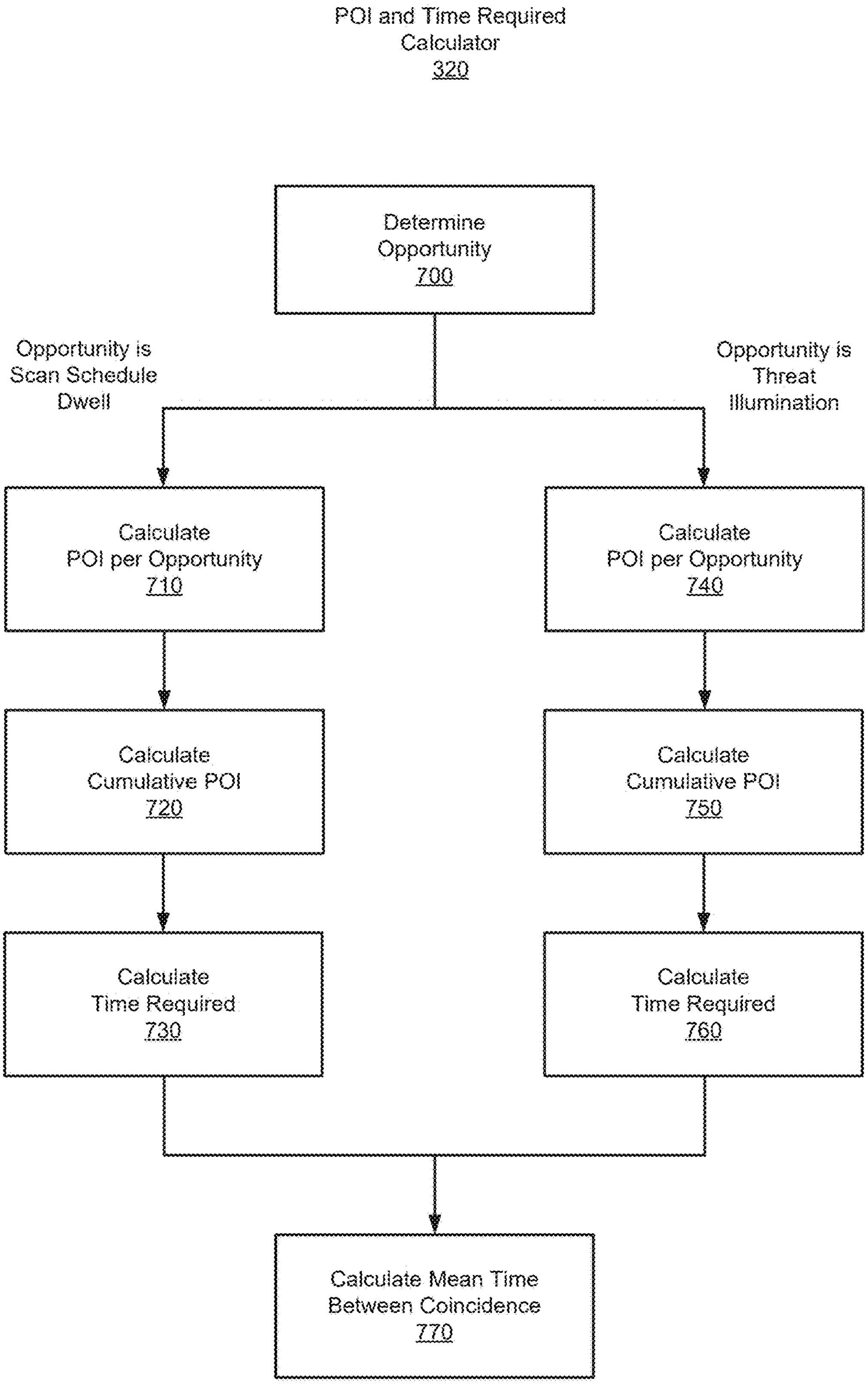
FIG. 7 is a block diagram of the probability of intercept (POI) and time required calculator of FIG. 3, configured in accordance with certain embodiments of the present disclosure.

FIG. 7 is a block diagram of the POI and time required calculator 320 of FIG. 3, configured in accordance with certain embodiments of the present disclosure. As previously noted, the POI is the probability of a scan schedule dwell coinciding with a threat illumination. The dwell duration is represented as $\tau_1$ and the dwell revisit time is represented as $T_1$. The threat illumination duration is represented as $\tau_2$ and the threat revisit is represented as $T_2$. An opportunity is the activity with the shortest revisit time. For example, if $T_1<T_2$ then each dwell of the scan schedule is an opportunity, otherwise each threat illumination is an opportunity. At operation 700, a determination is made as to the whether the opportunity is a scan schedule dwell or a threat illumination.

If the opportunity is a scan schedule dwell, then operations 710, 720, and 730 are performed. Otherwise, the opportunity is a threat illumination and operations 740, 750, and 760 are performed.

At operation 710, the POI for one scan schedule dwell opportunity ($P1_{opp}$) is calculated as follows:

$$\text{If } \tau_2 <= T_1 \text{ and } \tau_1 <= T_2 - T_1, \text{ then } P1_{opp} = \frac{1}{T_2}\left[\tau_1 + \tau_2\left(1 - \frac{\tau_2}{2T_1}\right)\right]$$

$$\text{If } \tau_2 >= T_1 \text{ and } \tau_1 <= T_2 - T_1, \text{ then } P1_{opp} = \frac{1}{T_2}\left(\tau_1 + \frac{T_1}{2}\right)$$

$$\text{If } \tau_2 <= T_1 \text{ and } \tau_1 >= T_2 - T_1, \text{ then } P1_{opp} = 1 - \frac{(T_1 - \tau_2)^2 + (T_2 - \tau_1)^2}{2T_1T_2}$$

$$\text{If } \tau_2 >= T_1 \text{ and } \tau_1 >= T_2 - T_1, \text{ then } P1_{opp} = 1 - \frac{(T_2 - \tau_1)^2}{2T_1T_2}$$

At operation 720, a cumulative POI over a given period of time is calculated as:

$$P_{cumulative}(\text{Time}) = 1 - [1 - P1_{opp}]^{\frac{Time}{T_1}}$$

At operation 730, a time required to achieve a desired cumulative POI is calculated as:

$$\text{Time}_{required} = T_1 * \frac{\ln(1 - P_{desired})}{\ln[1 - P1_{opp}]}$$

At operation 740, the POI for one threat illumination opportunity ($P2_{opp}$) is calculated as follows:

$$\text{If } \tau_1 < = T_2 \text{ and } \tau_2 <= T_1 - T_2, \text{ then } P2_{opp} = \frac{1}{T_1}\left[\tau_2 + \tau_1\left(1 - \frac{\tau_1}{2T_2}\right)\right]$$

$$\text{If } \tau_1 > = T_2 \text{ and } \tau_2 <= T_1 - T_2, \text{ then } P2_{opp} = \frac{1}{T_1}\left(\tau_2 + \frac{T_2}{2}\right)$$

$$\text{If } \tau_1 < = T_2 \text{ and } \tau_2 >= T_1 - T_2, \text{ then } P2_{opp} = 1 - \frac{(T_2 - \tau_1)^2 + (T_1 - \tau_2)^2}{2T_1T_2}$$

$$\text{If } \tau_1 > = T_2 \text{ and } \tau_2 >= T_1 - T_2, \text{ then } P2_{opp} = 1 - \frac{(T_1 - \tau_2)^2}{2T_1T_2}$$

At operation 750, a cumulative POI over a given period of time is calculated as:

$$P_{cumulative}(\text{Time}) = 1 - [1 - P1_{opp}]^{\frac{Time}{T_2}}$$

At operation 760, a time required to achieve a desired cumulative POI is calculated as:

$$\text{Time}_{required} = T_2 * \frac{\ln(1 - P_{desired})}{\ln[1 - P2_{opp}]}$$

At operation 770, the mean time between coincidences $T_0$ (e.g., the conjunction of a scan schedule dwell and a threat illumination) is calculated as:

$$T_0 = \frac{(T_1 * T_2)}{(\tau_1 + \tau_2)}$$

Figure 8:
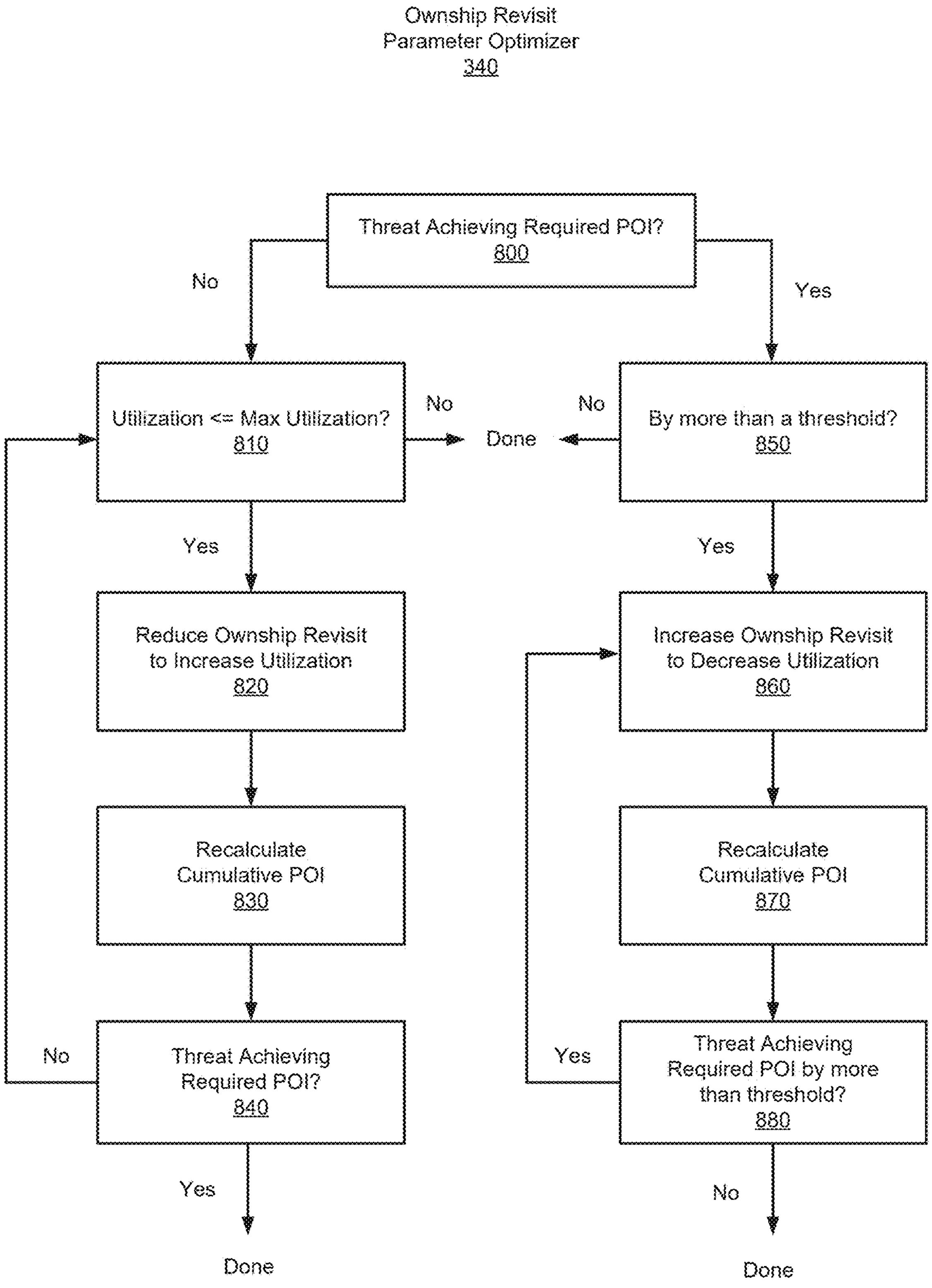
FIG. 8 is a block diagram of the ownship revisit parameter optimizer of FIG. 3, configured in accordance with certain embodiments of the present disclosure.

FIG. 8 is a block diagram of the ownship revisit parameter optimizer 340 of FIG. 3, configured in accordance with certain embodiments of the present disclosure. Ownship revisit parameter optimization is intended to maximize the number of threats that meet the required POI while managing system resources (e.g., utilization). At operation 800, a determination is made as to whether the required POI is being achieved for the threat. If the required POI is not being met, then operations 810 through 840 are performed, otherwise operations 850 through 880 are performed.

At operation 810, the current utilization is calculated as $\tau_1/T_1$ and compared to the maximum utilization (user specified). If the current utilization is greater than the maximum utilization, then no further revisit optimization is performed. Otherwise, at operation 820, the ownship revisit is reduced to increase utilization. In some embodiments, the ownship revisit may be reduced by one percent.

At operation 830, the cumulative POI is recalculated, as previously described.

At operation 840, if the required POI is now being achieved for the threat, then revisit optimization is completed. Otherwise, the process repeats back to operation 810 until either the required cumulative POI is achieved, or the threat consumes all available utilization.

At operation 850, if the cumulative POI exceeds the required POI by more than a threshold amount (e.g., five percent), then utilization for that threat can be reduced to provide increased utilization for other threats that are not meeting the POI requirement.

In that case, at operation 860, the ownship revisit is increased to decrease utilization. In some embodiments, the ownship revisit may be increased by one percent.

At operation 870, the cumulative POI is recalculated, as previously described.

At operation 880, if the new cumulative POI still exceeds the required POI by more than the threshold amount (e.g., five percent), then the process repeats back to operation 860 to further increase the ownship revisit, otherwise, no further revisit optimization is performed.

Figure 9:
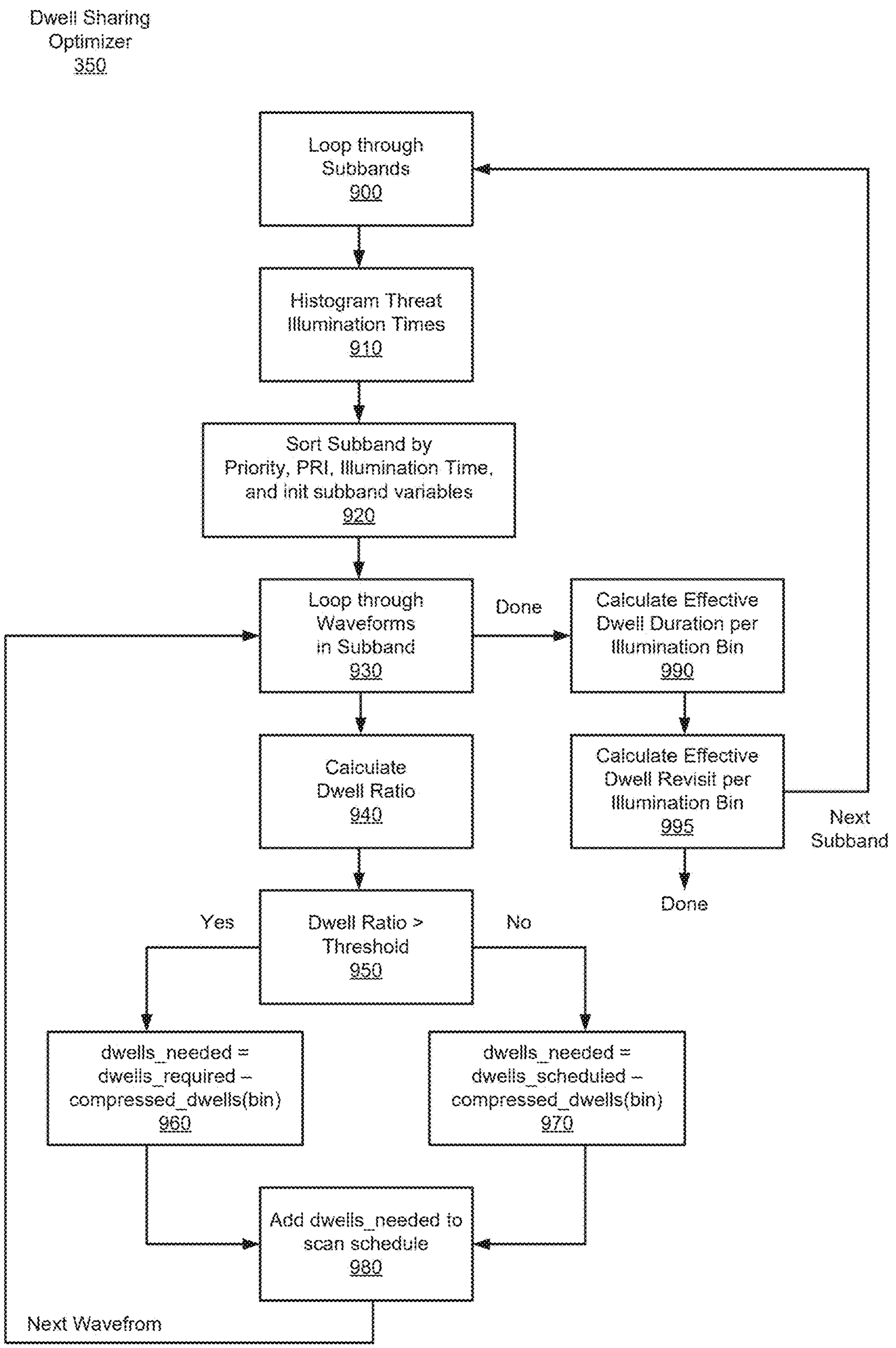
FIG. 9 is a block diagram of the dwell sharing optimizer of FIG. 3, configured in accordance with certain embodiments of the present disclosure.

FIG. 9 is a block diagram of the dwell sharing optimizer 350 of FIG. 3, configured in accordance with certain embodiments of the present disclosure. Attempting to schedule all the individual dwells required for each threat waveform will likely consume the available time and thus performance requirements would be met for only a few of the threat waveforms. Dwell sharing optimization is performed to compress the dwell schedule by finding dwells in the same subband that can be shared by two or more threat waveforms.

At operation 900, the process begins to loop through the subbands with a first threat waveform subband.

At operation 910, the threat waveform illumination times are histogrammed into bins. For threats to share dwells they must be in the same illumination time bin. The illumination times are the $Time_{required}$ to achieve a desired cumulative POI calculated by the POI and time required calculator 320, as previously described. In some embodiments, the number of histogram bins is calculated as:

illumination_bins=ceiling((max(illumination times)−min(illumination times))/0.08)

At operation 920, the threats in the current subband are sorted by priority (in ascending order), PRI (in descending order) and illumination time (in ascending order). Descending PRI ensures that PRI values align with sharing rules. The threat with the largest PRI is added to the scan schedule first. Threats with the same illumination histogram bin number and a smaller PRI value can share this dwell.

Subband variables are also initialized for each illumination bin. The parameter uncompressed_dwells is initialized to zero. This variable accumulates the total number of uncompressed dwells required for the subband. This variable is calculated so that a dwell compression ratio can be calculated at the end of the compression routines.

The parameter uncompressed_time is initialized to zero. This variable accumulates the total uncompressed time required for the subband. This variable is calculated so that a time compression ratio can be calculated at the end of the compression routines.

The parameter compressed_dwells is initialized to zero. This variable accumulates the total number of shared (compressed) dwells required for the subband. This variable is calculated so that a dwell compression ratio can be calculated at the end of the compression routines.

The parameter compressed_time is initialized to zero. This variable accumulates the total shared (compressed) time required for the subband. This variable is calculated so that a time compression ratio can be calculated at the end of the compression routines.

At operation 930, the process begins to loop through the waveforms in the current subband with the first waveform.

At operation 940, a dwell ratio is calculated. In some embodiments, the dwell ratio is calculated as:

dwell_ratio=dwells_scheduled/dwells_needed where dwells_scheduled is the number of dwells that are allocated to the scan schedule.

At operation 950, the dwell ratio is compared to a threshold. In some embodiments, the threshold is 0.85.

If the dwell ratio exceeds the threshold, then at operation 960, the following calculations are performed:

dwells_needed=dwells_required−compressed_dwells(bin)

uncompressed_dwells=uncompressed_dwells+dwells_required uncompressed_time=uncompressed_time+$Time_{required}$ compressed_dwells(bin)=compressed_dwells(bin)+dwells_needed compressed_time(bin)=compressed_time(bin)+(dwells_needed*dwell_duration)

where dwells_required is the number of dwells that are required to meet performance specifications, for example based on the $Time_{required}$.

Otherwise, at operation 970, the following calculations are performed:

dwells_needed=dwells_scheduled-compressed_dwells(bin)

uncompressed_dwells=uncompressed_dwells+dwells_required uncompressed_time=uncompressed_time+time_required compressed_dwells(bin)=compressed_dwells(bin)+dwells_needed compressed_time(bin)=compressed_time(bin)+(dwells_needed*dwell_duration)

At operation 980, the calculated dwells_needed is added to the scan schedule and the process loops back to operation 930 for the next waveform.

After all waveforms have been processed for the current subband, then at operation 990, an effective dwell duration per illumination bin is calculated. In some embodiments, the effective dwell duration per illumination bin is calculated as:

effective_dwell_duration(bin)=compressed_time(bin)/compressed_dwells(bin)

At operation 995, an effective dwell revisit per illumination bin is calculated and then the process loops back to operation 900 for the next subband until all subbands have been processed. In some embodiments, the effective dwell revisit per illumination bin is calculated as:

effective_dwell_revisit(bin)=TBSS/(compressed_dwell(bin)−effective_dwell_duration(bin))

where TBSS is the time between scan schedule starts.

Figure 10:
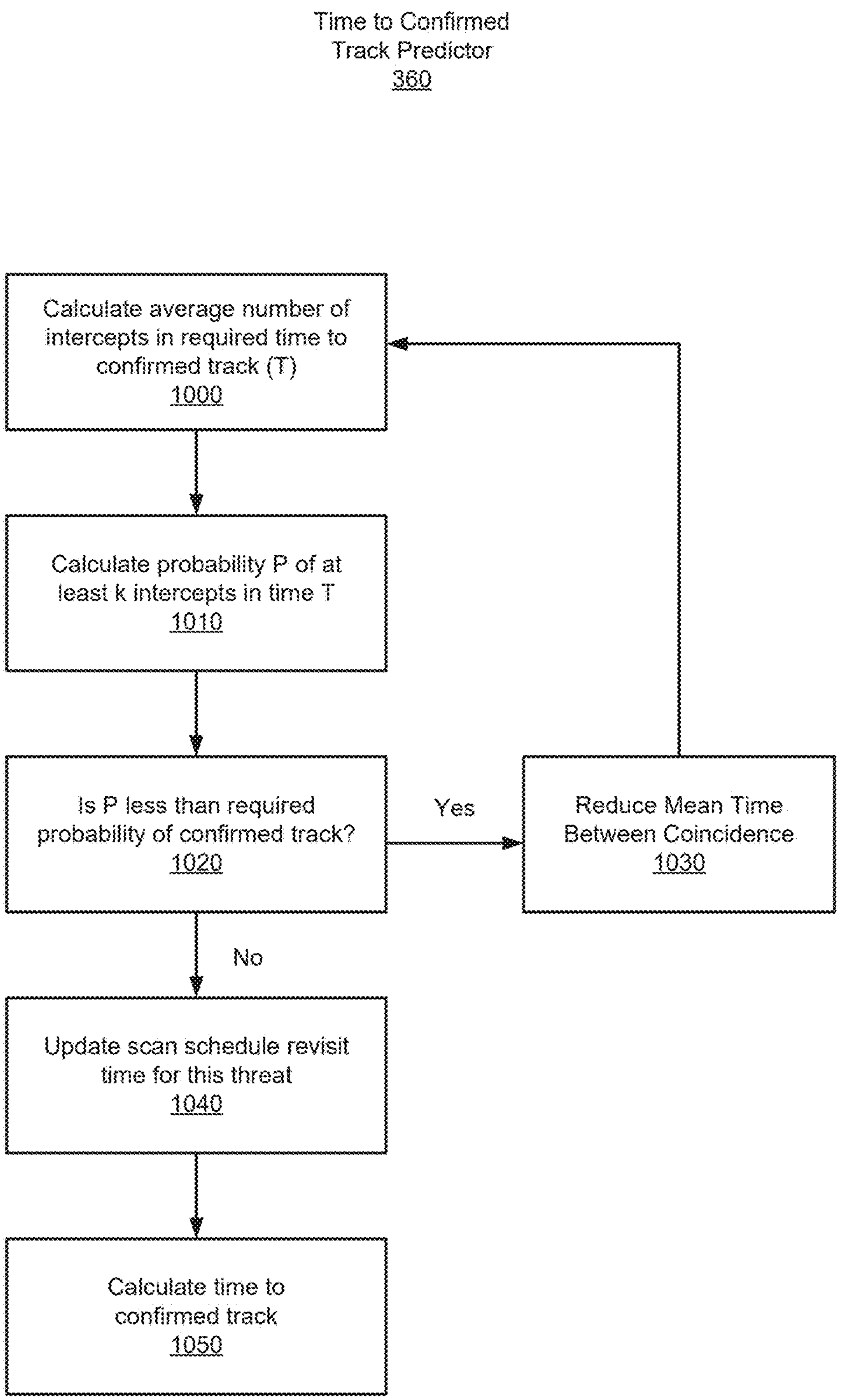
FIG. 10 is a block diagram of the time to confirmed track predictor of FIG. 3, configured in accordance with certain embodiments of the present disclosure.

FIG. 10 is a block diagram of the time to confirmed track predictor 360 of FIG. 3, configured in accordance with certain embodiments of the present disclosure. A confirmed track generally requires several intercepts in order to achieve a desired confidence level. The time required to achieve a confirmed track is provided as an operational requirement and is designated as T in the following description.

At operation 1000, the average number of intercepts A in the required time to confirmed track (T) is calculated. In some embodiments, the calculation is performed as:

$$A=(T/T_0*Pp*Pd)$$

where $T_0$ is the mean time between coincidence of the threat illumination and the scan schedule dwell, Pd is the probability of detection after threat acquisition (generally assumed to be 0.999), and Pp is the probability of correct processing (e.g., deinterleaving, clustering, and identification).

At operation 1010, the probability P of at least k intercepts in time T is calculated. In some embodiments, the calculation is performed as:

$$P(k, T) = 1 - \sum_{i=0}^{k-1} \exp(-A)\frac{A^i}{i!}$$

At operation 1020, if P is less than the required probability of confirmed track, then at operation 1030 the mean time between coincidence ($T_0$) is reduced and the process loops back to operation 1000. In some embodiments, the reduction of mean time between coincidence is two percent.

Otherwise, at operation 1040, the scan schedule revisit time ($T_1$) for this threat is updated. In some embodiments, $T_1$ is calculated as:

$$T_1=(T_0*\tau_2+\tau_1)/T_2$$

Then, at operation 1050, the time to confirmed track (TCT) is calculated. In some embodiments, the time to confirmed track is calculated as:

$$\text{time\_to\_confirmed\_track}=k*T_0$$

Figure 11:
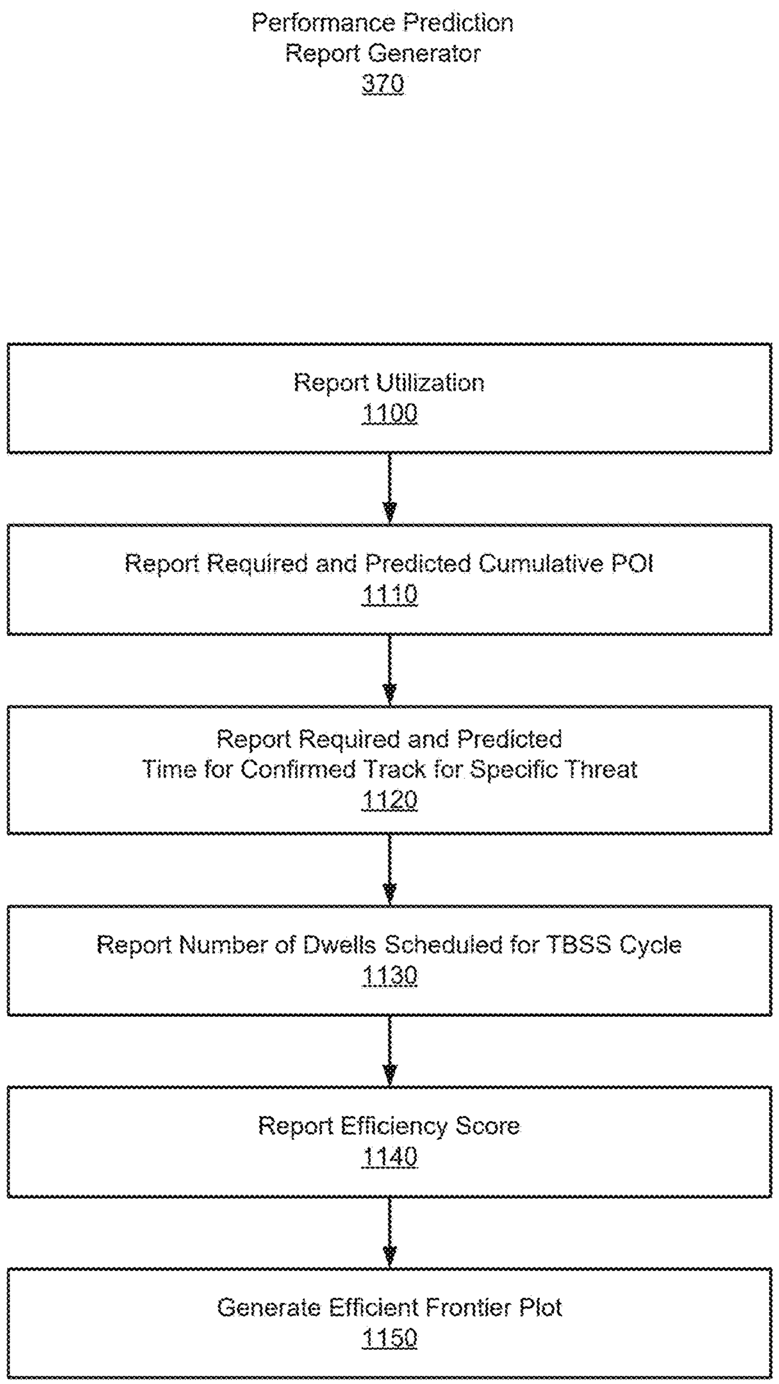
FIG. 11 is a block diagram of the performance prediction report generator of FIG. 3, configured in accordance with certain embodiments of the present disclosure.

FIG. 11 is a block diagram of the performance prediction report generator 370 of FIG. 3, configured in accordance with certain embodiments of the present disclosure. In some embodiments, the following information may be reported to a user.

At operation 1100, the utilization is reported.

At operation 1110, the required and predicted cumulative POI is reported.

At operation 1120, the required and predicted time to confirmed track is reported.

At operation 1130, a count of the number of dwells scheduled in the TBSS is reported.

At operation 1140, an efficiency score is reported. In some embodiments, the efficiency score is calculated, for a given threat, as a ratio of the number of other threats in the subband that share dwells with the given threat. The efficiency score may be normalized to a range of zero to one.

Figure 12:
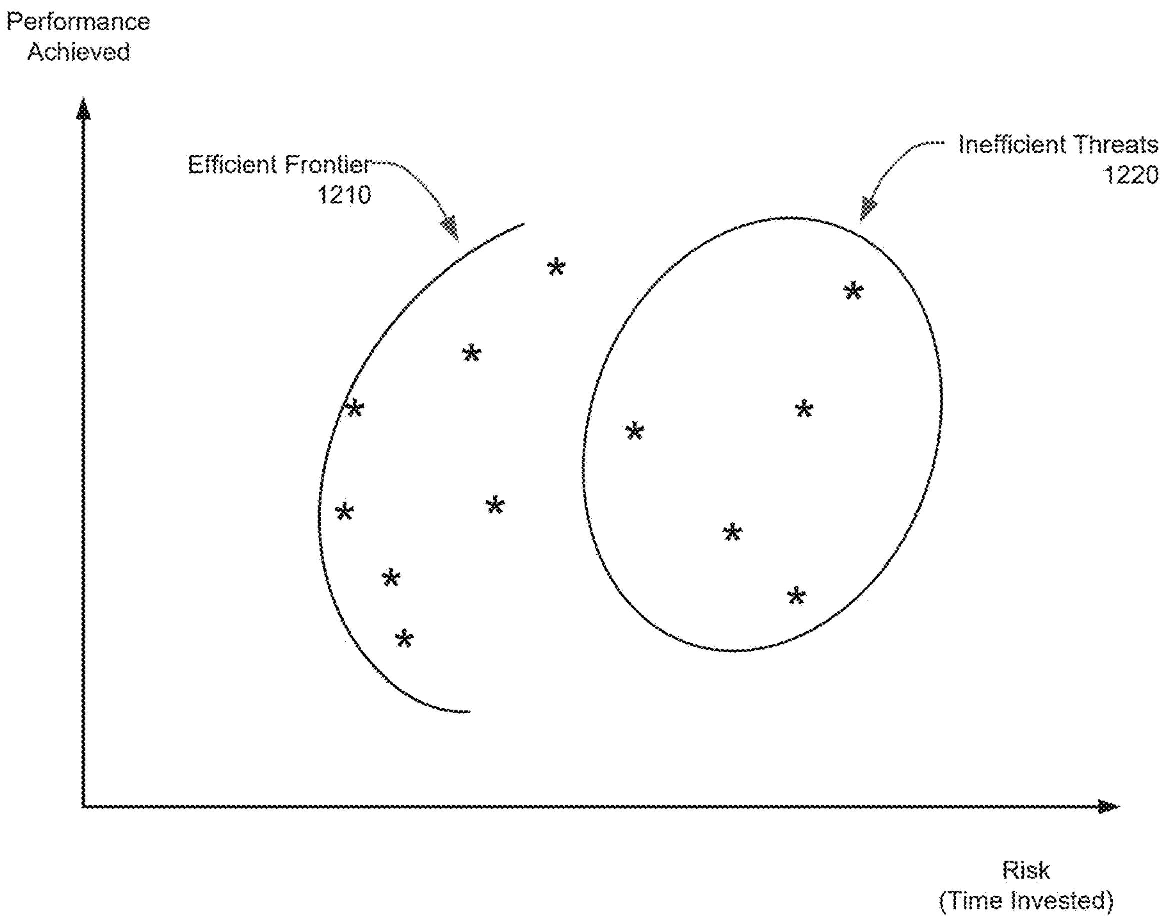
FIG. 12 illustrates an efficient frontier, in accordance with certain embodiments of the present disclosure.

At operation 1150, an efficient frontier plot is generated. FIG. 12 illustrates an efficient frontier 1200, in accordance with certain embodiments of the present disclosure. The plot shows performance achieved versus risk (e.g., due to time invested). The efficient frontier 1210 represents an efficient scan schedule that can be achieved with the defined threat list and available system resources. Inefficient threats 1220 are those threats for which the achieved performance is relatively low relative to the risk (or time invested) to include those threats in the scan schedule. Threats closer to the efficient frontier provide more benefit and may be included in the scan schedule. In some embodiments, the efficient frontier may be generated by removing threats that have the lowest impact scores, as described below, from the scan schedule until a targeted TBSS is achieved.

In some embodiments, the threat impact scores may be calculated as impact score=achieved performance/risk The achieved performance may be calculated as:

$$\text{achieved performance} = \frac{4}{\text{priority}} + \text{dwell}_{efficiency} - N_{utilization} + \frac{\text{required reaction time}}{\text{achieved reaction time}} + \frac{\text{achieved } POI}{\text{required } POI} + \frac{\text{achieved } TCT\ POI}{\text{required } TCT\ POI}$$

wherein priority is an integer between 1 and 4, 1 being the most lethal threats associated with weapons systems, and 4 being the least lethal threats that search and then hand off to other radars. Dwell efficiency is a score between 0 and 1 that is a ratio of the number of other threats in the subband that share dwells with this threat to the total number of threats in the subband. $N_{utilization}$ is the fraction of a TBSS dedicated to a specific threat, normalized to a range of 0 to 1.

In some embodiments, the risk for a threat may be calculated as:

risk=sqrt(sum(sum(covariance(threat_matrix))))/sqrt(sum(sum(covariance(subband_matrix))))

The threat_matrix comprises parameters T1, T2, T3, T4, T5 for the threat in the subband, for each of three processing tiers. The threat matrix is formed as:

| | T1 | T2 | T3 | T4 | T5 |
|---|---|---|---|---|---|
| Tier 1 | x | x | x | x | x |
| Tier 2 | x | x | x | x | x |
| Tier 3 | x | x | x | x | x |

where

T1=dwell duration of the threat at that processing tier,

T2=dwell revisit of the threat at that processing tier,

T3=time between intercepts of the threat at that processing tier,

T4=threat illumination time of the threat at that processing tier, and

T5=performance ratio of the threat at that processing tier, $$\text{performance\_ratio} = \text{mean}\left[\frac{\text{achieved reaction time}}{\text{required reaction time}} + \frac{\text{Number of Revisits Required for Required } POI}{\text{Number of Revisits Planned}} + \frac{\text{required } POI}{\text{achieved } POI}\right]$$

and the first tier is the output of the POI and time required calculator 320, the second tier is the output of the ownship revisit parameter optimizer 340, and the third tier is the output of the dwell sharing optimizer 350.

The subband_matrix comprises parameters S1, S2, S3, S4, S5 for each threat in the subband. The subband matrix is formed as:

| | S1 | S2 | S3 | S4 | S5 |
|---|---|---|---|---|---|
| Threat 1 | x | x | x | x | x |
| Threat 2 | x | x | x | x | x |
| . . . | | | | | |
| Threat N | x | x | x | x | x |

where

S1=dwell duration of the threat in the subband,

S2=dwell revisit of the threat in the subband,

S3=time between intercepts of the threat in the subband,

S4=threat illumination time of the threat in the subband, and

S5=performance ratio of the threat in the subband.

Methodology

Figure 13:
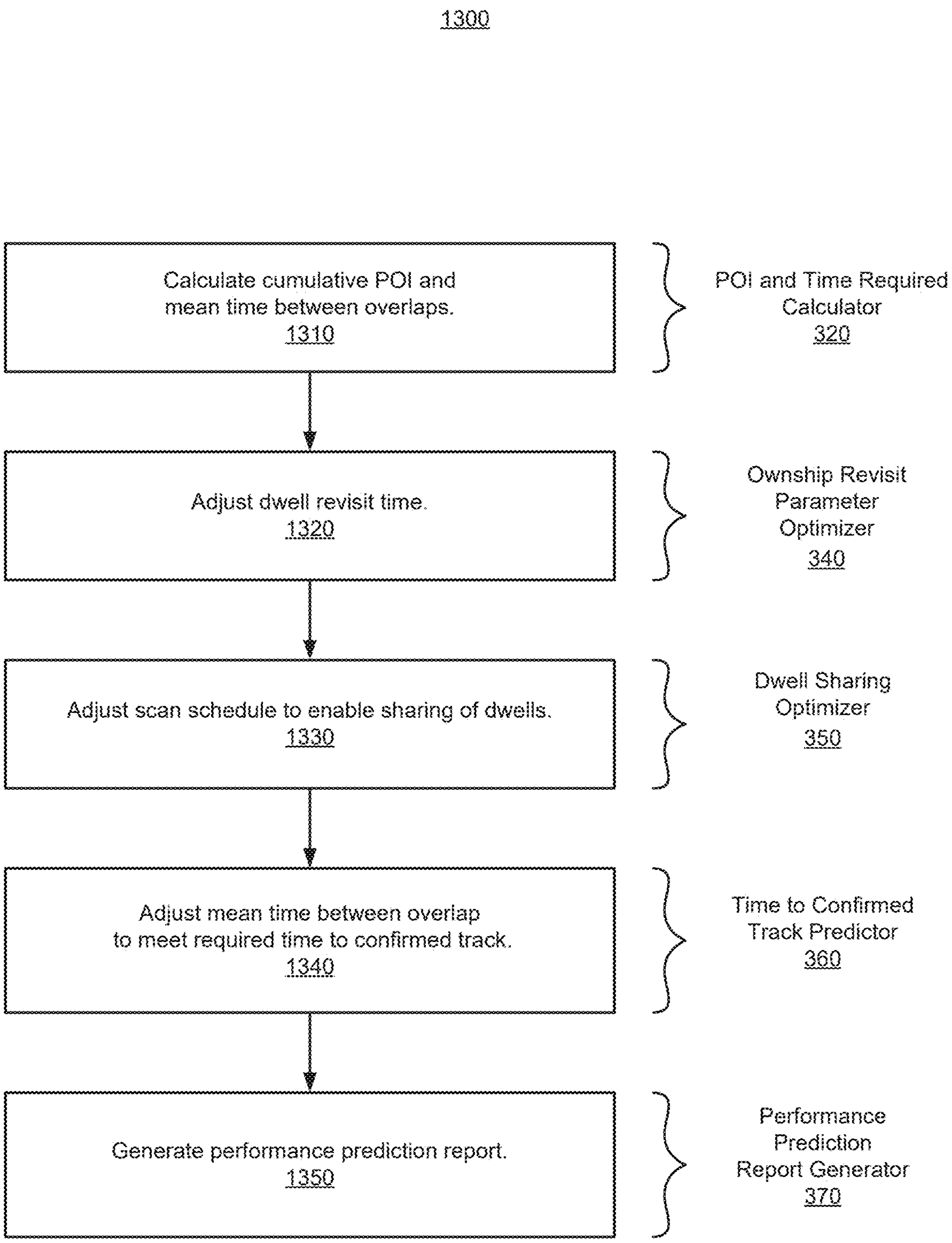
FIG. 13 is a flowchart illustrating a methodology for the operation of an RWR design tool, in accordance with certain embodiments of the present disclosure.

FIG. 13 is a flowchart illustrating a methodology 1300 for the operation of an RWR design tool, in accordance with certain embodiments of the present disclosure. As can be seen, example method 1300 includes a number of phases and sub-processes, the sequence of which may vary from one embodiment to another. However, when considered in aggregate, these phases and sub-processes form a process for operation of an RWR design tool, in accordance with certain of the embodiments disclosed herein, for example as illustrated in FIGS. 1-12, as described above. However other system architectures can be used in other embodiments, as will be apparent in light of this disclosure. To this end, the correlation of the various functions shown in FIG. 13 to the specific components illustrated in the figures, is not intended to imply any structural and/or use limitations. Rather other embodiments may include, for example, varying degrees of integration wherein multiple functionalities are effectively performed by one system. Numerous variations and alternative configurations will be apparent in light of this disclosure.

In one embodiment, method 1300 commences, at operation 1310, by calculating a cumulative POI of a threat signal based on overlaps of dwell durations of an RWR scan schedule with threat illuminations, and calculating a mean time between the overlaps.

At operation 1320, the dwell revisit time of the RWR is adjusted based on utilization of the RWR and based on a comparison of the cumulative POI to a required POI, wherein utilization is a ratio of the dwell duration of the RWR to the dwell revisit time of the RWR. In some embodiments, the dwell revisit time is reduced in response to determining that the utilization is less than a threshold maximum utilization and the cumulative POI of the threat is less than the required POI. In some embodiments, the dwell revisit time is increased in response to determining that the cumulative POI of the threat is greater than the required POI.

At operation 1330, the scan schedule of the RWR is adjusted to enable sharing of dwells by a plurality of threats based on PRIs of the threats and based on the durations of the threat illuminations. In some embodiments, the threats are histogrammed into bins based on priority of the threats, PRI of the threats, and the durations of the threat illuminations, and the dwells are shared by threats that share the histogram bins.

At operation 1340, the mean time between the overlaps is adjusted to provide a predicted time to confirmed track that achieves the required time to confirmed track. The predicted time to confirmed track is proportional to the adjusted mean time between the overlaps. In some embodiments, the mean time between the overlaps is adjusted based on a calculation of expected probability of achieving a threshold number of intercepts in the required time to confirmed track.

At operation 1350, a performance prediction report is generated. The report includes the utilization of the RWR, the cumulative POI of the threat signal, and the predicted time to confirmed track, such that a design of the RWR may be based on the performance prediction report.

In some embodiments, additional operations may be performed, as previously described in connection with the system. For example, the method may further comprise determining whether the dwell revisit time of the RWR is greater than the dwell revisit time of the threat, and calculating the cumulative POI and the mean time between the overlaps further based on the determination.

Example System

Figure 14:
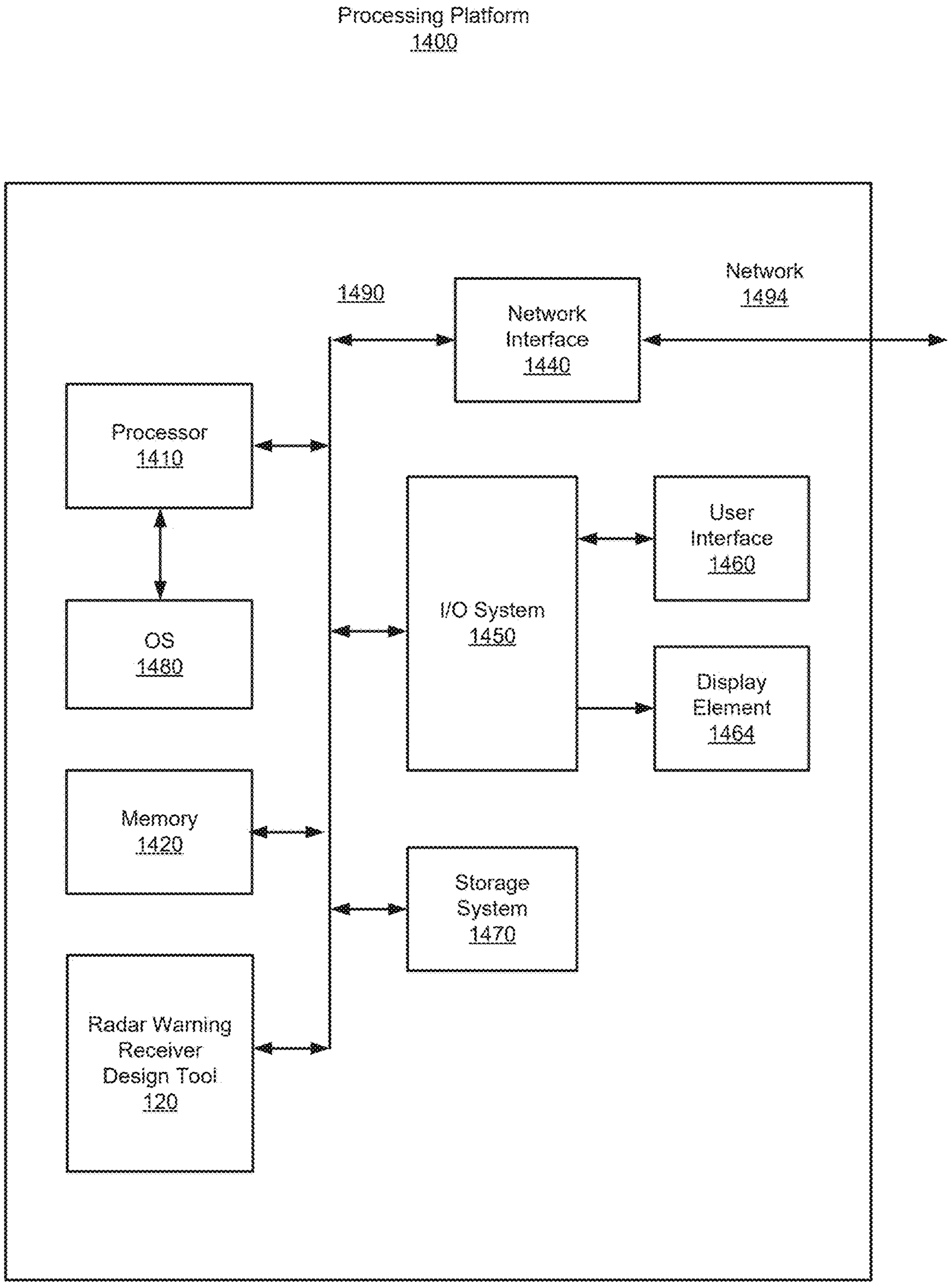
FIG. 14 is a block diagram of a processing platform configured to implement the RWR design tool of FIG. 1, in accordance with an embodiment of the present disclosure.

FIG. 14 is a block diagram of a processing platform 1400 configured to implement the RWR design tool 120 of FIG. 1, in accordance with an embodiment of the present disclosure. In some embodiments, platform 1400, or portions thereof, may be hosted on, or otherwise be incorporated into the electronic systems of an RWR design system. The disclosed techniques may be used to aid in the design of a scan schedule and the selection of other operating parameters for the RWR.

In some embodiments, platform 1400 may comprise any combination of a processor 1410, memory 1420, RWR design tool 120, a network interface 1440, an input/output (I/O) system 1450, a user interface 1460, a display element 1464, and a storage system 1470. As can be further seen, a bus and/or interconnect 1490 is also provided to allow for communication between the various components listed above and/or other components not shown. Platform 1400 can be coupled to a network 1494 through network interface 1440 to allow for communications with other computing devices, platforms, devices to be controlled, or other resources. Other componentry and functionality not reflected in the block diagram of FIG. 14 will be apparent in light of this disclosure, and it will be appreciated that other embodiments are not limited to any particular hardware configuration.

Processor 1410 can be any suitable processor, and may include one or more coprocessors or controllers, such as an audio processor, a graphics processing unit, or hardware accelerator, to assist in the execution of mission software and/or any control and processing operations associated with platform 1400, including control of the directional IFF transponder system 140. In some embodiments, the processor 1410 may be implemented as any number of processor cores. The processor (or processor cores) may be any type of processor, such as, for example, a micro-processor, an embedded processor, a digital signal processor (DSP), a graphics processor (GPU), a tensor processing unit (TPU), a network processor, a field programmable gate array or other device configured to execute code. The processors may be multithreaded cores in that they may include more than one hardware thread context (or "logical processor") per core. Processor 1410 may be implemented as a complex instruction set computer (CISC) or a reduced instruction set computer (RISC) processor. In some embodiments, processor 1410 may be configured as an x86 instruction set compatible processor.

Memory 1420 can be implemented using any suitable type of digital storage including, for example, flash memory and/or random access memory (RAM). In some embodiments, the memory 1420 may include various layers of memory hierarchy and/or memory caches as are known to those of skill in the art. Memory 1420 may be implemented as a volatile memory device such as, but not limited to, a RAM, dynamic RAM (DRAM), or static RAM (SRAM) device. Storage system 1470 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device.

Processor 1410 may be configured to execute an Operating System (OS) 1480 which may comprise any suitable operating system, such as Google Android (Google Inc., Mountain View, CA), Microsoft Windows (Microsoft Corp., Redmond, WA), Apple OS X (Apple Inc., Cupertino, CA), Linux, or a real-time operating system (RTOS). As will be appreciated in light of this disclosure, the techniques provided herein can be implemented without regard to the particular operating system provided in conjunction with platform 1400, and therefore may also be implemented using any suitable existing or subsequently-developed platform.

Network interface circuit 1440 can be any appropriate network chip or chipset which allows for wired and/or wireless connection between other components of platform 1400 and/or network 1494, thereby enabling platform 1400 to communicate with other local and/or remote computing systems, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution) and 5G, Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 1450 may be configured to interface between various I/O devices and other components of platform 1400. I/O devices may include, but not be limited to, user interface 1460 and display element 1464. User interface 1460 may include devices (not shown) such as a touchpad, cockpit display unit, keyboard, and mouse, etc., for example, to allow the user to control the system. Display element 1464 may be configured to display information to a user. I/O system 1450 may include a graphics subsystem configured to perform processing of images for rendering on the display element 1464. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 1410 or any chipset of platform 1400.

It will be appreciated that in some embodiments, the various components of platform 1400 may be combined or integrated in a system-on-a-chip (SoC) architecture. In some embodiments, the components may be hardware components, firmware components, software components or any suitable combination of hardware, firmware or software.

RWR design tool 120 is configured to provide an efficient dwell schedule that maximizes threat coverage, as described previously. The RWR design tool 120 may include any or all of the circuits/components/processes illustrated in FIGS. 1-13, as described above. These components can be implemented or otherwise used in conjunction with a variety of suitable software and/or hardware that is coupled to or that otherwise forms a part of platform 1400. These components can additionally or alternatively be implemented or otherwise used in conjunction with user I/O devices that are capable of providing information to, and receiving information and commands from, a user.

In various embodiments, platform 1400 may be implemented as a wireless system, a wired system, or a combination of both. When implemented as a wireless system, platform 1400 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, platform 1400 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. The instructions can be encoded using a suitable programming language, such as C, C++, object oriented C, Java, JavaScript, Visual Basic. NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 1494. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments platform 1400 may comprise additional, fewer, or alternative subcomponents as compared to those included in the example embodiment of FIG. 14.

The aforementioned non-transitory computer readable medium may be any suitable medium for storing digital information, such as a hard drive, a server, a flash memory, and/or random-access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method, process, and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood, however, that other embodiments may be practiced without these specific details, or otherwise with a different set of details. It will be further appreciated that the specific structural and functional details disclosed herein are representative of example embodiments and are not necessarily intended to limit the scope of the present disclosure. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

FURTHER EXAMPLE EMBODIMENTS

The following examples pertain to further embodiments, from which numerous permutations and configurations will be apparent.

Example 1 is a radar warning receiver (RWR) threat analysis system comprising: a processor configured to perform functions of a probability of intercept (POI) module, a revisit module, and a dwell sharing module, wherein, the POI module is configured to calculate a cumulative POI of a threat signal based on overlaps of dwell durations of an RWR scan schedule with durations of a threat illumination, and to calculate a mean time between the overlaps; the revisit module is configured to adjust a dwell revisit time of the RWR based on utilization of the RWR and based on a comparison of the cumulative POI to a required POI, wherein utilization is a ratio of the dwell duration of the RWR to the dwell revisit time of the RWR; and a dwell sharing module is configured to adjust a scan schedule of the RWR, the scan schedule comprising the dwell durations and the dwell revisit times of the RWR, the adjustment to enable sharing of dwells by a plurality of threats based on pulse repetition intervals (PRIs) of the threats and based on the durations of the threat illuminations.

Example 2 includes the system of Example 1, further comprising a time to confirmed track predictor configured to adjust the mean time between the overlaps to provide a predicted time to confirmed track that achieves a required time to confirmed track, wherein the predicted time to confirmed track is proportional to the adjusted mean time between the overlaps.

Example 3 includes the system of Example 2, wherein the time to confirmed track predictor is configured to adjust the mean time between the overlaps based on a calculation of expected probability of achieving a threshold number of intercepts in the required time to confirmed track.

Example 4 includes the system of any of Examples 1-3, wherein the POI module is configured to determine whether the dwell revisit time of the RWR is greater than a dwell revisit time of the threat, and to calculate the cumulative POI and the mean time between the overlaps further based on the determination.

Example 5 includes the system of any of Examples 1-4, wherein the revisit module is configured to reduce the dwell revisit time in response to determining that the utilization is less than a threshold maximum utilization and the cumulative POI of the threat is less than the required POI.

Example 6 includes the system of any of Examples 1-5, wherein the revisit module is configured to increase the dwell revisit time in response to determining that the cumulative POI of the threat is greater than the required POI.

Example 7 includes the system of any of Examples 1-6, wherein the dwell sharing module is configured to histogram the threats into bins based on priority of the threats, PRI of the threats, and the durations of the threat illumination, and enable the sharing of dwells by threats that share the histogram bins.

Example 8 is a method for threat analysis for a radar warning receiver (RWR), the method comprising: calculating, by a processor-based system, a cumulative probability of intercept (POI) of a threat signal based on overlaps of dwell durations of an RWR scan schedule with durations of a threat illumination, and calculating a mean time between the overlaps; adjusting, by the processor-based system, a dwell revisit time of the RWR based on utilization of the RWR and based on a comparison of the cumulative POI to a required POI, wherein utilization is a ratio of the dwell duration of the RWR to the dwell revisit time of the RWR; adjusting, by the processor-based system, a scan schedule of the RWR, the scan schedule comprising the dwell durations and the dwell revisit times of the RWR, the adjustment to enable sharing of dwells by a plurality of threats based on pulse repetition intervals (PRIs) of the threats and based on the durations of the threat illuminations; and adjusting, by the processor-based system, the mean time between the overlaps to provide a predicted time to confirmed track that achieves a required time to confirmed track, wherein the predicted time to confirmed track is proportional to the adjusted mean time between the overlaps.

Example 9 includes the method of Example 8, further comprising determining whether the dwell revisit time of the RWR is greater than a dwell revisit time of the threat, and calculating the cumulative POI and the mean time between the overlaps further based on the determination.

Example 10 includes the method of Examples 8 or 9, further comprising reducing the dwell revisit time in response to determining that the utilization is less than a threshold maximum utilization and the cumulative POI of the threat is less than the required POI.

Example 11 includes the method of any of Examples 8-10, further comprising increasing the dwell revisit time in response to determining that the cumulative POI of the threat is greater than the required POI.

Example 12 includes the method of any of Examples 8-11, further comprising histogramming the threats into bins based on priority of the threats, PRI of the threats, and the durations of the threat illumination, and enabling the sharing of dwells by threats that share the histogram bins.

Example 13 includes the method of any of Examples 8-12, further comprising adjusting the mean time between the overlaps based on a calculation of expected probability of achieving a threshold number of intercepts in the required time to confirmed track.

Example 14 includes the method of any of Examples 8-13, further comprising providing a performance prediction report comprising the utilization of the RWR, the cumulative POI of the threat signal, and the predicted time to confirmed track, wherein a design of the RWR is based on the performance prediction report.

Example 15 is a computer program product including one or more non-transitory machine-readable mediums encoded with instructions that when executed by one or more processors cause a process to be carried out for threat analysis for a radar warning receiver (RWR), the process comprising: calculating a cumulative probability of intercept (POI) of a threat signal based on overlaps of dwell durations of an RWR scan schedule with durations of a threat illumination, and calculating a mean time between the overlaps; adjusting a dwell revisit time of the RWR based on utilization of the RWR and based on a comparison of the cumulative POI to a required POI, wherein utilization is a ratio of the dwell duration of the RWR to the dwell revisit time of the RWR; adjusting a scan schedule of the RWR, the scan schedule comprising the dwell durations and the dwell revisit times of the RWR, the adjustment to enable sharing of dwells by a plurality of threats based on pulse repetition intervals (PRIs) of the threats and based on the durations of the threat illuminations; and adjusting the mean time between the overlaps to provide a predicted time to confirmed track that achieves a required time to confirmed track, wherein the predicted time to confirmed track is proportional to the adjusted mean time between the overlaps.

Example 16 includes the computer program product of Example 15, wherein the process further comprises determining whether the dwell revisit time of the RWR is greater than a dwell revisit time of the threat and calculating the cumulative POI and the mean time between the overlaps further based on the determination.

Example 17 includes the computer program product of Examples 15 or 16, wherein the process further comprises reducing the dwell revisit time in response to determining that the utilization is less than a threshold maximum utilization and the cumulative POI of the threat is less than the required POI.

Example 18 includes the computer program product of any of Examples 15-17, wherein the process further comprises increasing the dwell revisit time in response to determining that the cumulative POI of the threat is greater than the required POI.

Example 19 includes the computer program product of any of Examples 15-18, wherein the process further comprises histogramming the threats into bins based on priority of the threats, PRI of the threats, and the durations of the threat illumination, and enabling the sharing of dwells by threats that share the histogram bins.

Example 20 includes the computer program product of any of Examples 15-19, wherein the process further comprises adjusting the mean time between the overlaps based on a calculation of expected probability of achieving a threshold number of intercepts in the required time to confirmed track.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. A radar warning receiver (RWR) threat analysis system comprising:

a processor configured to perform functions of a probability of intercept (POI) module, a revisit module, and a dwell sharing module, wherein, the POI module is configured to calculate a POI for one scan schedule dwell opportunity (P1opp), calculate a cumulative POI over a given period of time as: $P_{comulative}$ (Time)=1−

$$(1 - P1_{opp})^{\frac{Time}{T1}}$$

based on overlaps of dwell durations of an RWR scan schedule with durations of a threat illumination, and to calculate a mean time between the overlaps, wherein a mean time between coincidences T0 is calculated as:

$$T0 = \frac{(\tau_1 * \tau_2)}{(\tau_1 + \tau_2)},$$

where T1 is the dwell revisit time, T2 is the threat revisit time, $\tau_1$ is the dwell duration, and $\tau_2$ is the threat illumination duration;

the revisit module is configured to adjust a dwell revisit time of the RWR based on utilization of the RWR and based on a comparison of the cumulative POI to a required POI, wherein utilization is a ratio of the dwell duration of the RWR to the dwell revisit time of the RWR; and a dwell sharing module is configured to adjust a scan schedule of the RWR, the scan schedule comprising the dwell durations and the dwell revisit times of the RWR, the adjustment to enable sharing of dwells by a plurality of threats based on pulse repetition intervals (PRIs) of the threats and based on the durations of the threat illuminations.

2. The system of claim 1, further comprising a time to confirmed track predictor configured to adjust the mean time between the overlaps to provide a predicted time to confirmed track that achieves a required time to confirmed track, wherein the predicted time to confirmed track is proportional to the adjusted mean time between the overlaps.

3. The system of claim 2, wherein the time to confirmed track predictor is configured to adjust the mean time between the overlaps based on a calculation of expected probability of achieving a threshold number of intercepts in the required time to confirmed track.

4. The system of claim 1, wherein the POI module is configured to determine whether the dwell revisit time of the RWR is greater than a dwell revisit time of the threat, and to calculate the cumulative POI and the mean time between the overlaps further based on the determination.

5. The system of claim 1, wherein the revisit module is configured to reduce the dwell revisit time in response to determining that the utilization is less than a threshold maximum utilization and the cumulative POI of the threat is less than the required POI.

6. The system of claim 1, wherein the revisit module is configured to increase the dwell revisit time in response to determining that the cumulative POI of the threat is greater than the required POI.

7. The system of claim 1, wherein the dwell sharing module is configured to histogram the threats into bins based on priority of the threats, PRI of the threats, and the durations of the threat illumination, and enable the sharing of dwells by threats that share the histogram bins.

8. A method for threat analysis for a radar warning receiver (RWR), the method comprising:

calculating, by a processor-based system, a POI for one scan schedule dwell opportunity (P1opp), calculate a cumulative POI over a given period of time as:

$$P_{cumulative}(\text{Time}) = 1 - (1 - P1_{opp})^{\frac{Time}{T1}}$$

based on overlaps of dwell durations of an RWR scan schedule with durations of a threat illumination, and to calculate a mean time between the overlaps, wherein a mean time between coincidences T0 is calculated as:

$$T0 = \frac{(\tau_1 * \tau_2)}{(\tau_1 + \tau_2)},$$

where T1 is the dwell revisit time, T2 is the threat revisit time, $\tau_1$ is the dwell duration, and $\tau_2$ is the threat illumination duration;

adjusting, by the processor-based system, a dwell revisit time of the RWR based on utilization of the RWR and based on a comparison of the cumulative POI to a required POI, wherein utilization is a ratio of the dwell duration of the RWR to the dwell revisit time of the RWR;

adjusting, by the processor-based system, a scan schedule of the RWR, the scan schedule comprising the dwell durations and the dwell revisit times of the RWR, the adjustment to enable sharing of dwells by a plurality of threats based on pulse repetition intervals (PRIs) of the threats and based on the durations of the threat illuminations; and adjusting, by the processor-based system, the mean time between the overlaps to provide a predicted time to confirmed track that achieves a required time to confirmed track, wherein the predicted time to confirmed track is proportional to the adjusted mean time between the overlaps.

9. The method of claim 8, further comprising determining whether the dwell revisit time of the RWR is greater than a dwell revisit time of the threat, and calculating the cumulative POI and the mean time between the overlaps further based on the determination.

10. The method of claim 8, further comprising reducing the dwell revisit time in response to determining that the utilization is less than a threshold maximum utilization and the cumulative POI of the threat is less than the required POI.

11. The method of claim 8, further comprising increasing the dwell revisit time in response to determining that the cumulative POI of the threat is greater than the required POI.

12. The method of claim 8, further comprising histogramming the threats into bins based on priority of the threats, PRI of the threats, and the durations of the threat illumination, and enabling the sharing of dwells by threats that share the histogram bins.

13. The method of claim 8, further comprising adjusting the mean time between the overlaps based on a calculation of expected probability of achieving a threshold number of intercepts in the required time to confirmed track.

14. The method of claim 8, further comprising providing a performance prediction report comprising the utilization of the RWR, the cumulative POI of the threat signal, and the predicted time to confirmed track, wherein a design of the RWR is based on the performance prediction report.

15. A computer program product including one or more non-transitory machine-readable mediums encoded with instructions that when executed by one or more processors cause a process to be carried out for threat analysis for a radar warning receiver (RWR), the process comprising:

calculating a probability of intercept (POI) for one scan schedule dwell opportunity (P1opp);

calculating a POI of a threat signal as $$P_{cumulative}(\text{Time}) = 1 - (1 - P1_{opp})^{\frac{Time}{T1}}$$

based on overlaps of dwell durations of an RWR scan schedule with durations of a threat illumination, and to calculate a mean time between the overlaps, wherein a mean time between coincidences T0 is calculated as $$T0 = \frac{(\tau_1 * \tau_2)}{(\tau_1 + \tau_2)},$$

where T1 is the dwell revisit time, T2 is the threat revisit time, $\tau_1$ is the dwell duration, and $\tau_2$ is the threat illumination duration;

adjusting a dwell revisit time of the RWR based on utilization of the RWR and based on a comparison of the cumulative POI to a required POI, wherein utilization is a ratio of the dwell duration of the RWR to the dwell revisit time of the RWR;

adjusting a scan schedule of the RWR, the scan schedule comprising the dwell durations and the dwell revisit times of the RWR, the adjustment to enable sharing of dwells by a plurality of threats based on pulse repetition intervals (PRIs) of the threats and based on the durations of the threat illuminations; and adjusting the mean time between the overlaps to provide a predicted time to confirmed track that achieves a required time to confirmed track, wherein the predicted time to confirmed track is proportional to the adjusted mean time between the overlaps.

16. The computer program product of claim 15, wherein the process further comprises determining whether the dwell revisit time of the RWR is greater than a dwell revisit time of the threat and calculating the cumulative POI and the mean time between the overlaps further based on the determination.

17. The computer program product of claim 15, wherein the process further comprises reducing the dwell revisit time in response to determining that the utilization is less than a threshold maximum utilization and the cumulative POI of the threat is less than the required POI.

18. The computer program product of claim 15, wherein the process further comprises increasing the dwell revisit time in response to determining that the cumulative POI of the threat is greater than the required POI.

19. The computer program product of claim 15, wherein the process further comprises histogramming the threats into bins based on priority of the threats, PRI of the threats, and the durations of the threat illumination, and enabling the sharing of dwells by threats that share the histogram bins.

20. The computer program product of claim 15, wherein the process further comprises adjusting the mean time between the overlaps based on a calculation of expected probability of achieving a threshold number of intercepts in the required time to confirmed track.

* * * * *